United States Patent [19]

Trouiller et al.

[11] Patent Number: 5,036,283
[45] Date of Patent: Jul. 30, 1991

[54] METHOD AND APPARATUS FOR MEASURING THE RESISTIVITY OF EARTH FORMATIONS USING ANTI-PARALLEL ACTIVE AND PASSIVE FOCUSSING ELECTRODES

[75] Inventors: Jean-Claude Trouiller, Saint-Rémy-lès-Chevreuse; Marie-Therese Gounot, Le Vésinet, both of France

[73] Assignee: Schlumberger Technology Corporation, New York, N.Y.

[21] Appl. No.: 483,039

[22] Filed: Feb. 20, 1990

[30] Foreign Application Priority Data

Feb. 20, 1989 [FR] France .................. 89 02158

[51] Int. Cl.$^5$ .................................. G01V 3/20
[52] U.S. Cl. ........................ 324/375; 324/374
[58] Field of Search ............... 324/367, 373, 374, 375, 324/347, 351, 354, 355, 366; 73/151, 152

[56] References Cited

U.S. PATENT DOCUMENTS

| | | | |
|---|---|---|---|
| 2,750,557 | 6/1956 | Bricaud | 324/374 X |
| 2,961,600 | 11/1960 | Tanguy | 324/374 |
| 3,017,566 | 1/1962 | Schuster | 324/374 |
| 3,136,942 | 6/1964 | Schuster . | |
| 3,579,098 | 5/1971 | Mougne | 324/375 |
| 3,798,535 | 3/1974 | Schuster . | |
| 4,117,394 | 9/1978 | Souhaité . | |
| 4,412,180 | 10/1983 | Desbrandes . | |
| 4,594,552 | 6/1986 | Grimaldi et al. . | |
| 4,614,250 | 9/1986 | Panetta et al. . | |
| 4,931,736 | 6/1990 | Barlai et al. | 324/367 |

OTHER PUBLICATIONS

Oberto Serra, *Fundamentals of Well-Log Interpretation,* 1. "The Acquisition of Logging Data", Elsevier, 1984, pp. 1–76.

*Primary Examiner*—Reinhard J. Eisenzopf
*Assistant Examiner*—Warren S. Edmonds
*Attorney, Agent, or Firm*—Leonard W. Pojunas

[57] ABSTRACT

The invention relates to a logging method and apparatus for determining the electrical resistivity of an earth formation traversed by a borehole. The resistivity is determined using a measuring pad which has a central electrode operable to deliver a measuring current. The measuring current is focused radially by means of two focusing systems: an active focusing system which focuses the measuring current in a first direction; and a passive focusing system which focuses the measuring current in a second direction perpendicular to said first direction.

28 Claims, 7 Drawing Sheets

FIG_1

FIG_2
PRIOR ART

FIG_5

FIG_6

EQUIPOTENTIAL SURFACES

CURRENT LINES

FIG. 7

FIG_8

FIG_9

FIG_10

METHOD AND APPARATUS FOR MEASURING THE RESISTIVITY OF EARTH FORMATIONS USING ANTI-PARALLEL ACTIVE AND PASSIVE FOCUSSING ELECTRODES

BACKGROUND OF THE INVENTION

1. Technical Field

The present invention is directed to measuring the resistivity of an earth formation traversed by a borehole. More particularly, the pi is directed to measuring the resistivity of the formation located in the region relatively close to the wall of the borehole, i.e., the region which has been invaded by mud filtrate as a result of drilling the borehole.

2. Background Information

During drilling operations, it is common to maintain a hydrostatic pressure produced by the column of mud filling the borehole at a value which is slightly greater than the pressure of the earth formations. This gives rise to the invasion of mud filtrate into the formation along with a deposit of mud cake on the wall of the borehole. See, e.g., U.S. Pat. No. 4,594,552 to Grimaldi, et al., assigned to the same assignee as the present invention, and O. Serra, *Fundamentals of Well-Log Interpretation*, Vol. 1, "The Acquisition of Logging Data", Elsevier, pps. 29–76 (1984). Both references are herein incorporated by reference.

Most prior apparatus used for determining resistivity (Rxo) of the invaded zone include an elongated support member which moves along the borehole, and a pad supported thereby which presses against the wall of the borehole. The face of the pad which contacts the wall of the borehole included an array of electrodes.

In general, two large families can be distinguished: focused apparatus and nonfocused apparatus. As used herein, the term focused apparatus refers to a system for focusing the measuring current. The family of focused apparatuses includes, in particular, the microspherical focusing apparatus described in U.S. Pat. No. 3,798,535 to Schuster and the azimuth focusing apparatus described in U.S. Pat. No. 4,117,394 to Souhaité, both assigned to the same assignee as the present invention, and both herein incorporated by reference.

The pad described in U.S. Pat. No. 4,117,394, shown in front view in FIG. 2 of the present application, is provided with an array of linear electrodes which lie substantially parallel to the longitudinal axis of the borehole and spaced apart from one another in a direction which is substantially perpendicular to the longitudinal axis. This array comprises central electrode $A_0$ and three pairs of electrodes $M_1$, $M_2$ and $A_1$ disposed symmetrically about central electrode $A_0$. Electrode $A_0$ delivers measuring current which penetrates into the formation and returns via the support member. The lines of the measuring current are focused by a focusing current delivered by outer pair of electrodes $A_1$ with the value of the focusing current being continuously adjusted in such a manner as to ensure that the potential difference observed between electrodes $M_1$ and $M_2$ (referred to as "monitor" electrodes) is substantially zero. This servo-controlled system thus has the effect of concentrating the lines of measuring current to flow radially in a direction perpendicular to the axis of the borehole. The focusing system is said to be "active", in contrast to a "passive" focusing system based solely on guard electrodes.

Although the above-described arrangement is advantageous with respect to the size of its pad compared with the micro-spherical focusing pad of U.S. Pat. No. 3,798,535, the measurement performed by such a pad is nevertheless rapidly degraded with increasing thickness of the mud cake deposited on the wall of the borehole. For mud cake about 6 mm, the observed measurement error may be as much as 50%.

SUMMARY OF THE INVENTION

The object of the present invention is therefore to provide a logging method and apparatus which considerably reduce the above-mentioned drawbacks and which make it possible to obtain a more accurate quantitative measurement of the resistivity of the formation in the zone invaded by mud filtrate.

The invention provides a logging method for determining the electrical resistivity of an earth formation traversed by a borehole passes, with the resistivity being determined by using a measuring pad adapted to be pressed against the wall of the borehole and provided on its face which comes into contact with the wall of the borehole with an array of electrodes. The method comprises the following steps:

delivering a measuring current from a central electrode of said array of electrodes;

receiving said measuring current in a zone situated inside the borehole, behind the pad;

focusing said measuring current readially in a first direction perpendicular or parallel to the axis of the borehole by means of an active focusing system;

focusing said measuring current radially along a second direction which is perpendicular to said first direction, i.e. respectively parallel or perpendicular to the axis of the borehole, by means of a passive focusing system; and measuring the value of the measuring current in order to determine the resistivity of the formation.

Preferably, the step consisting in focusing said measuring current by means of an active focusing system comprises:

delivering a first focusing current from a pair of focusing electrodes disposed symmetrically in said first direction about the central electrode; and adjusting the value of the first focusing current so as to maintain the potential difference between a first and a second pair of monitor electrodes at zero, with the electrodes of each pair being disposed symmetrically along said first direction about the central electrode, between the central electrode and the pair of focusing electrodes.

Preferably, the step consisting in focusing said measuring current by means of a passive focusing system comprises:

delivering a second focusing current from at least one guard electrode disposed symmetrically in said second direction about the central electrode; and maintaining the central electrode at the potential of the guard electrode.

In a modified embodiment, the method of the invention also includes the following steps:

focusing said measuring current radially along said first direction by means of the passive focusing system; and focusing said measuring current radially along said second direction by means of a second active focusing system independent from the first active focusing system.

The invention further provides a logging apparatus for determining the electrical resistivity of an earth formation traversed by a borehole, with the resistivity being determined by using a measuring pad designed to be pressed against the wall of the borehole and provided on its face which comes into contact with the wall of the borehole with a array of electrodes. The apparatus comprises:

a central electrode belonging to said array of electrodes and suitable for delivering a measuring current;

a return electrode for receiving said measuring current in a zone situated inside the borehole, behind the pad;

an active focusing system suitable for focusing said measuring current radially along a first direction perpendicular or parallel to the axis of the borehole;

a passive focusing system suitable for focusing said measuring current radially along a second direction which is perpendicular to said first direction, i.e. respectively parallel or perpendicular to the axis of the borehole; and means for measuring the value of the measuring current in order to determine the resistivity of the formation.

Preferably, the active focusing system comprises:

a pair of focusing electrodes disposed symmetrically along said first direction about the central electrode and suitable for delivering a first focusing current; and means for adjusting the value of the first focusing current in such a manner as to maintain the potential difference between first and second pairs of monitor electrodes at zero, the electrodes of each pair being disposed symmetrically along said first direction about the central electrode, between the central electrode and the pair of focusing electrodes.

Preferably, the passive focusing system comprises:

at least one guard electrode disposed symmetrically along said second direction about the central electrode and suitable for delivering a second focusing current; and means for maintaining the central electrode at the potential of the guard electrode.

Depending on the embodiment envisioned, the passive focusing system has one or two guard electrodes.

When the passive focusing system has two guard electrodes, each these electrodes may be constituted by a surface which is substantially rectangular or which is polygonal in the form of a T-shape. When the system has only one guard electrode, the latter completely surrounds the central electrode and it may be formed by a surface which is substantially rectangular or which is polygonal in the form of an I-shape.

In the preferred embodiment, the first and second directions are respectively perpendicular and parallel to the axis of the borehole. The guard electrode is constituted by an I-shaped polygonal surface whose horizontal branches extend on either side of the vertical branch by a distance equal to the distance between the central electrode and the focusing electrodes. In addition, the guard electrode and the pair of monitor electrodes closest to the central electrode are constituted by a single electrode.

In a modification of the preferred embodiment, a plurality of additional electrodes substantially identical to the central electrode are disposed inside the polygonal surface constituted by the guard electrode and spaced apart along one and/or the other of the said directions. Each of them is maintained at the same potential as the guard electrode and each delivers an additional measuring current whose magnitude is measured.

In another modified embodiment, each of the monitor electrodes is constituted by a plurality of monitor electrodes in alignment.

DESCRIPTION OF THE PREFERRED EMBODIMENT

Figures 1, 2:
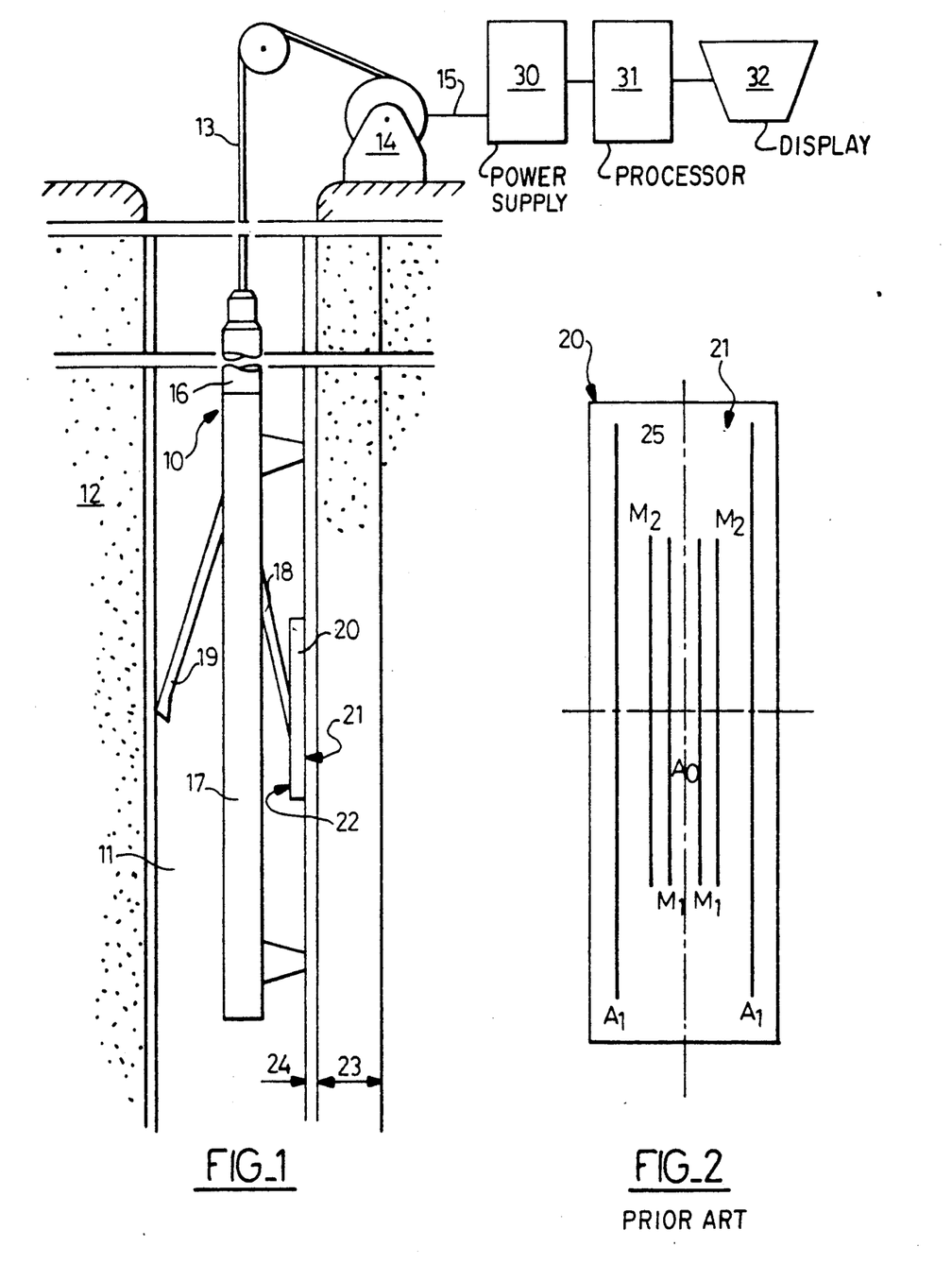
FIG. 1 is a diagram of an electrical logging tool suspended in a borehole and provided with a measuring pad which is pressed against the wall of the borehole.
FIG. 2 is a front view of a prior art pad which is provided with an array of linear electrodes.

FIG. 1 shows in schematic form electrical logging tool 10 disposed in borehole 11 traversing earth formations 12 and filled with drilling mud. FIG. 1 also illustrates mudcake 24 and invaded zone 23. In conventional manner, the tool is suspended at the end of multi-conductor cable 13 which is wound on winch mechanism 14, with cable 15 being connected to surface equipment. This equipment comprises, in conventional manner, circuits 30 for supplying electrical power and for controlling the tool, circuits 31 for acquiring and processing data sensed by the tool, and devices 32 for displaying data.

In general, the tool 10 essentially comprises two portions. The first portion, electronics cartridge 16, controls tool operation, preprocesses the measurement signals and provides a telemetry interface with the acquisition circuits on the surface. The second portion, comprises sonde 17 having retractable arm 18 which carries at its end measuring pad 20 adapted for engagement with the wall of the borehole, and a back-up arm 19. A detailed description of such a sonde is found in U.S. Pat. No. 4,594,552 to Grimaldi, et al.

Alternatively, the sonde of U.S. Pat. No. 4,614,250 to Panetta et al, assigned to the same assignee as the present invention and incorporated herein by reference, which includes four arms regularly distributed around the sonde body with each of the arms being equipped with a measuring pad may be used. The advantage of the alternative arrangement lies in the fact that it makes it possible to obtain four simultaneous measurements of resistivity.

With reference to FIGS. 3A, 3B, 3C and 3D, the front face of the pad in accordance with the present invention is provided with an array of electrodes separated from each other by electrically insulating material 25.

Central electrode $A_{Ob}$ is suitable for delivering measuring current $I_{Ob}$ which penetrates into the formation prior to returning via return electrode B situated in the borehole behind the pad. The return electrode could be constituted, for example, by the rear face of the pad, arm 18 which supports the pad, and that portion of the outer casing of sonde 17 which is disposed at the same level as pad 20.

In accordance with the present invention, the measuring current $I_{Ob}$ is focussed radially as follows: along a first direction which is perpendicular or parallel to the axis of the borehole by means of an active focusing system; and along a second direction which is perpendicular to the first direction, i.e., respectively parallel or perpendicular to the axis of the borehole, by means of a passive focusing system.

Preferably, the first direction is perpendicular to the axis of the borehole and the second direction is parallel to the axis of the borehole. For the sake of simplicity, the description below is based on this particular orientation, but it should be understood that the other orientation can be obtained by merely rotating the pad, i.e., through 90°.

Firstly, the active focusing system may be similar to that described in U.S. Pat. No. 4,117,394, for example, and which corresponds to a type of focusing known under the name "Laterolog 7". Other active focusing systems could also be used, e.g., those known by the names "Laterolog 8" or "Laterolog 9", tradenames of the assignee of the present invention.

Secondly, the passive focusing system is based on guard electrodes which are at the same potential as the central electrode.

Figure 3A:
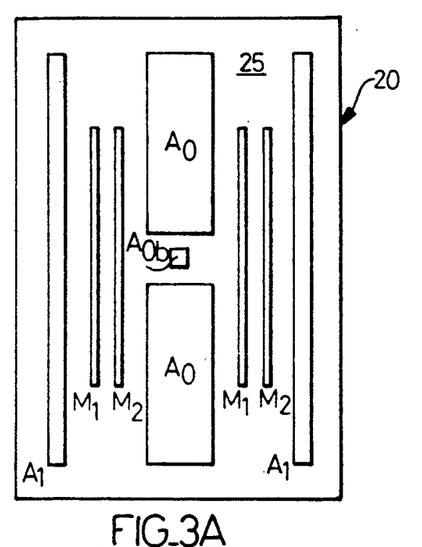
FIGS. 3A, 3B, 3C and 3D are front views of different embodiments of a pad in accordance with the present invention.

In a first embodiment shown in FIG. 3A, four pairs of elongate electrodes $A_0$, $M_1$, $M_2$ and $A_1$ lying substantially parallel to the longitudinal axis of the borehole are disposed symmetrically about central electrode $A_{Ob}$. The electrodes in each pair are electrically short circuited together.

Going away from the central electrode in a direction parallel to the axis of the tool, there is only one electrode referred to as guard electrode $A_0$. Going away from the central electrode in a direction perpendicular to the axis of the tool, first and second electrodes referred to respectively as monitor electrodes $M_1$ and $M_2$ are encountered in succession, and finally a third electrode is encountered referred to as the focusing electrode $A_1$.

Firstly, pair of electrodes $A_1$ is adapted to deliver focusing current $I_1$ sharing the same return as the measuring current $I_{Ob}$ and intended to focus the measuring current $I_{Ob}$ radially along a direction perpendicular to the axis of the borehole. The magnitude of the current $I_1$ is constantly adjusted in such a manner as to maintain a substantially zero potential difference between the electrodes $M_1$ and $M_2$.

Secondly, guard electrode $A_0$ is adapted to deliver a focusing current $I_0$ sharing the same return as the measuring current $I_{Ob}$ and the focusing current $I_1$. The magnitude of measuring current $I_{Ob}$ is adjusted in such a manner as to ensure that the potential of the central electrode is substantially equal to that of the guard electrode $A_0$.

Figure 3B:
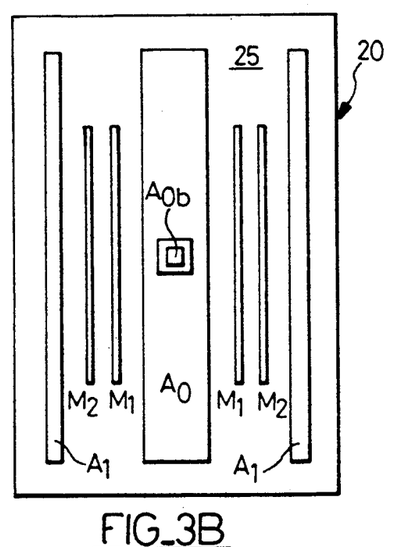

In a second embodiment of the pad shown in FIG. 3B, guard electrode $A_O$ is constituted by a single electrode whose outline is rectangular and which has an inner contour going closely around the shape of central electrode $A_{Ob}$. Thus, electrode $A_O$ completely surrounds central electrode $A_{Ob}$. This form of guard electrode is particularly advantageous in that it makes it possible to set up a barrier to leakage currents from central electrode $A_{Ob}$ which would otherwise tend to transit sideways towards the conducting surface constituted by monitor electrodes $M_1$ and $M_2$.

Figure 3C:
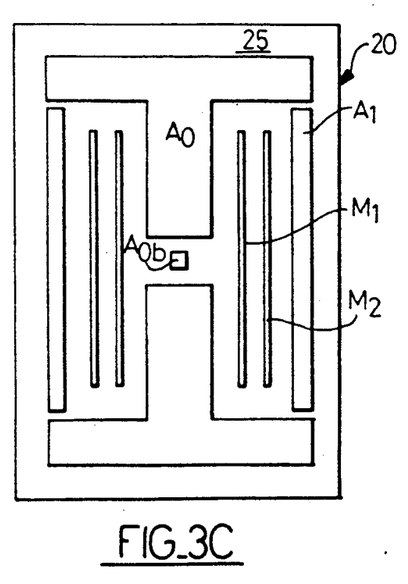

In a third embodiment shown in FIG. 3C, pair of guard electrodes $A_O$ is constituted by two surfaces each constituting a T-shaped polygon, said surfaces being disposed symmetrically about central electrode $A_{Ob}$. The feet of the T-shapes are disposed adjacent central electrode $A_{Ob}$ and their horizontal branches extend on either side of their vertical branches through a distance which is preferably not less than the distance between central electrode $A_{Ob}$ and that pair of monitor electrodes $M_2$ which is furthest from the central electrode. Preferably, the horizontal branches also overlie the outer pair of electrodes $A_1$, i.e. the horizontal branches extend on either side of the main branch through a distance which is equal to the distance between central electrode $A_{Ob}$ and pair of focusing electrodes $A_1$. The horizontal branches of guard electrode $A_O$ constitute a barrier to leakage currents which could transit longitudinally along the conducting surface formed by electrodes $M_1$, $M_2$ and $A_1$, in order to reach the return B.

Figure 3D:
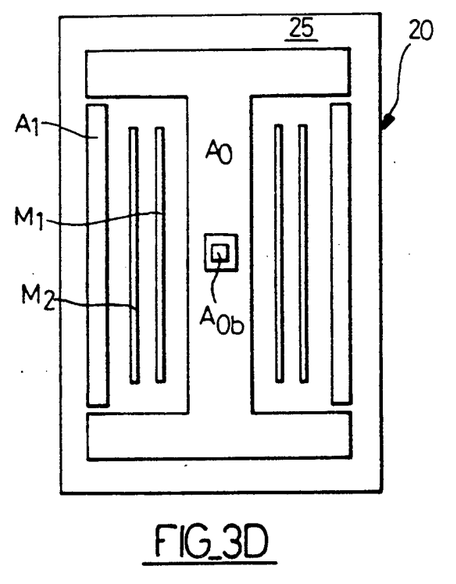

FIG. 3D shows yet another embodiment which combines the embodiments described with reference to FIGS. 3B and 3C. Guard electrode $A_O$ is constituted by a single electrode whose outline is in the form of an I-shaped polygon and which has an inside contour running closely round the shape of central electrode $A_{Ob}$. The top and bottom horizontal branches of the I-shape extend on either side of the main branch through a distance equal to that which exists between central electrode $A_{Ob}$ and pair of focusing electrodes $A_1$. This particular shape of guard electrode $A_O$ provides two barriers to leakage currents from the electrode $A_{Ob}$: a first, lateral barrier between $A_{Ob}$ and $M_1$, $M_2$ and $A_1$, and a second, longitudinal barrier between the ends of the electrodes $M_1$, $M_2$ and $A_1$, and the return B.

Figure 4:
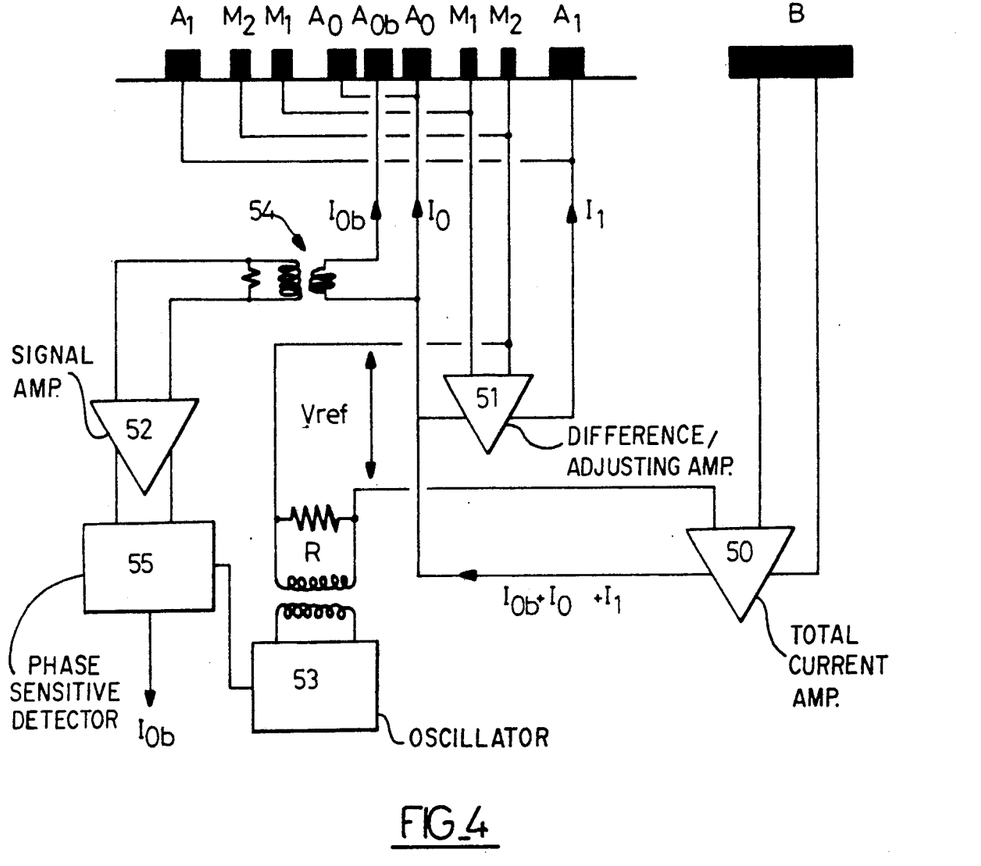
FIG. 4 shows an electrical circuit associated with the array of electrodes in the various embodiments of FIGS. 3A, 3B, 3C and 3C.

The electrical circuit associated with this family of arrays is now described with reference to FIG. 4. By way of example, it is assumed that pad 20 is provided with the electrode array shown in FIG. 3D, and current returns via an electrode B which is constituted by the rear face of pad 22, arm 18 which supports the pad, and said portion of the outer casing of sonde 17. As mentioned above, the electrodes of each pair are electrically short circuited together.

Oscillator 53 preferably operating at a frequency in the range 500 Hz to 50 kHz delivers a voltage Vref across the terminals of resistor R, thereby defining the potential difference to be maintained between electrodes $M_2$ and B. First current amplifier 50 delivers a total current $It = I_{Ob} + I_0 + I_1$, respectively feeding electrode $A_{Ob}$ with a current $I_{Ob}$, electrode $A_0$ with a current $I_0$, and electrode $A_1$ with a current $I_1$. The currents $I_{Ob}$, $I_0$ and $I_1$ return via the electrode B.

Second current amplifier 51 is used to adjust the current $I_1$ so that the potential difference between monitor electrodes $M_1$ and $M_2$ remains zero.

The branch circuit which feeds electrode $A_{Ob}$ with the current $I_{Ob}$ is connected to very low input impedance current transformer 54 which provides an almost perfect short circuit between electrodes $A_0$ and $A_{Ob}$ such that electrodes $A_{Ob}$ and $A_0$ are at the same potential. The signal received by current transformer 54 is subsequently amplified by amplifier 52. The amplified signal is filtered by phase sensitive detector 55, driven by oscillator 53, and which delivers a signal representative of the value of the current $I_{0b}$.

The resistivity Rxo of the formation is given by the equation:

$$Rxo = K(Vref/I_{0b})$$

in which K is a constant which is determined experimentally.

Figure 5:
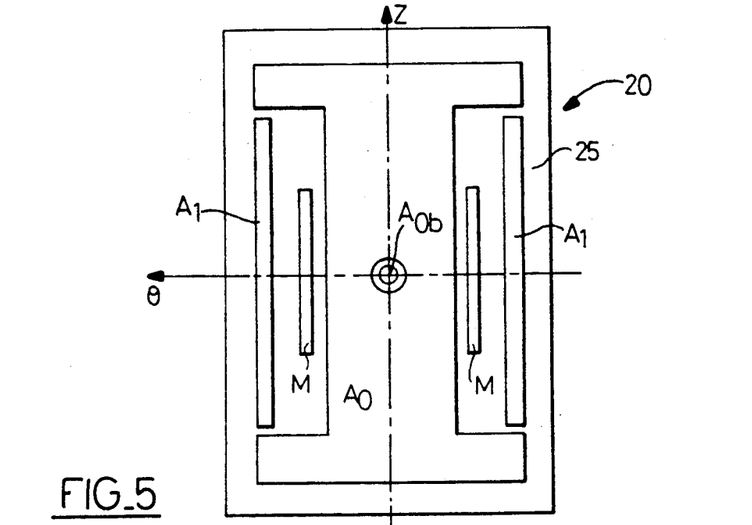
FIG. 5 is a front view of the preferred embodiment of the pad.

FIG. 5 shows another embodiment of the present invention. In this embodiment, there is only one guard electrode and it completely surrounds central electrode $A_{0b}$. In addition, the guard electrode and the first pair of monitor electrodes are now constituted by single electrode $A_0$. The remaining pair of monitor electrodes is referenced M. Electrode $A_O$ is constituted by a polygonal surface which is I-shaped with horizontal branches that extend on either side of the vertical branch by a distance equal to the distance between the central electrode and the focusing electrodes. With central electrode $A_{0b}$ which is in the form of a circle preferably having a diameter of about 5 mm, it is possible to obtain a depth of investigation of about 8 cm.

Figure 6:
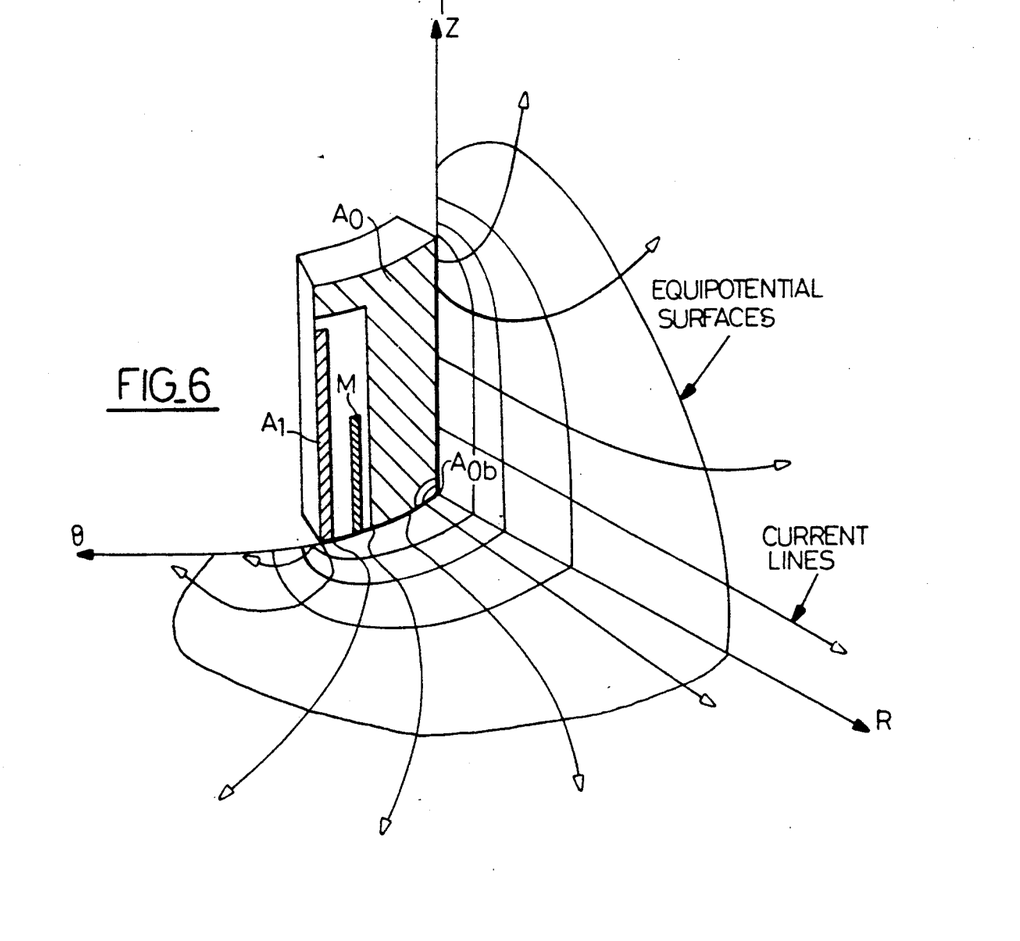
FIG. 6 is a perspective view showing the current lines and the equipotential surfaces associated with one fourth of the pad shown in FIG. 5.

FIG. 6 represents the top left quarter of the pad shown in FIG. 5, together with current lines and equipotential surfaces in the formation to be measured. It should be observed, in particular, that the lines of current coming from central electrode $A_{0b}$ are rectilinear and perpendicular to the face of the pad. In other words, the combination of an active focusing system with a passive focusing system in two perpendicular directions provides radial focusing which is much better than that obtained using prior art apparatuses.

Figure 7:
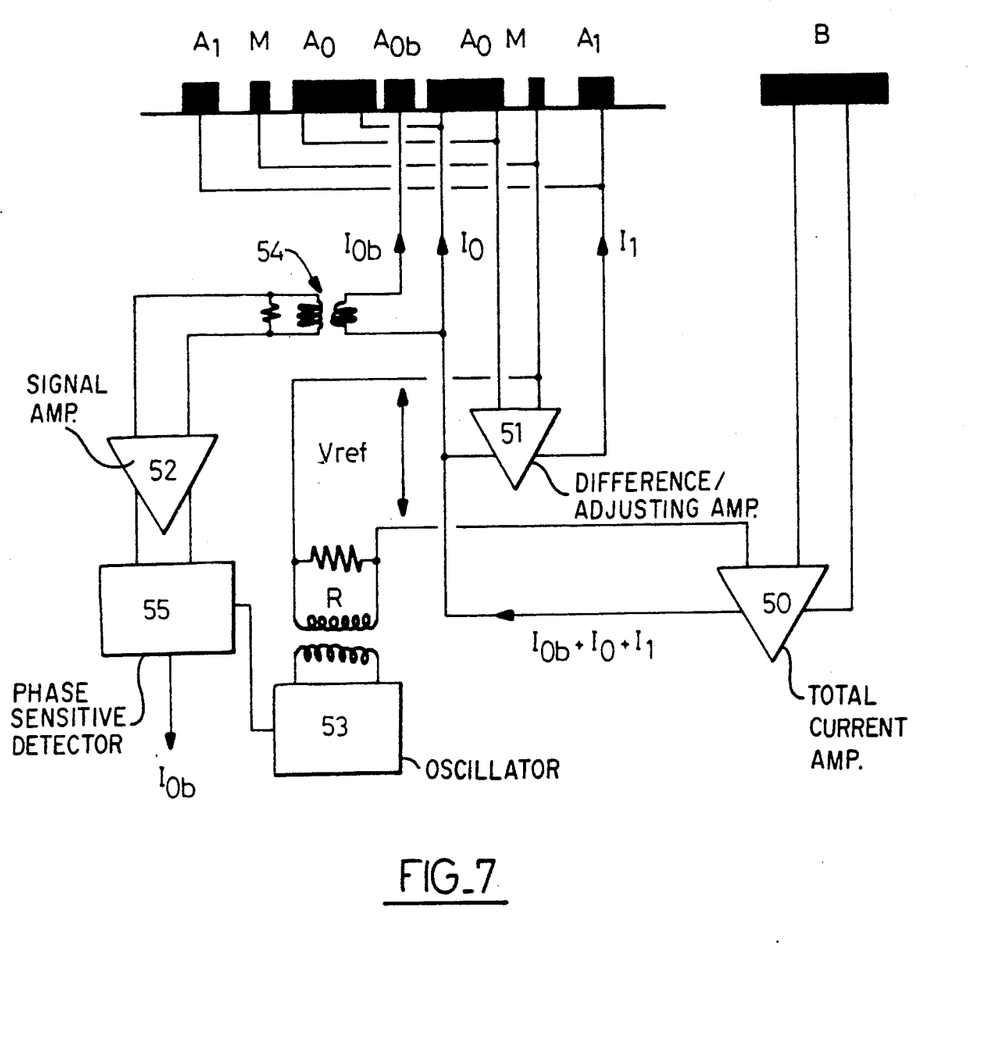
FIG. 7 shows an electrical circuit associated with the array of electrodes shown in FIG. 5.

FIG. 7 shows the electrical circuit associated with the preferred embodiment of FIGS. 5 and 6. It is essentially the same as the general circuit shown in FIG. 4 except insofar as the pair of guard electrodes $A_0$ and first pair of monitor electrodes $M_1$ has been replaced by electrode $A_0$, and the remaining pair of monitor electrodes is now referenced M.

Figure 8:
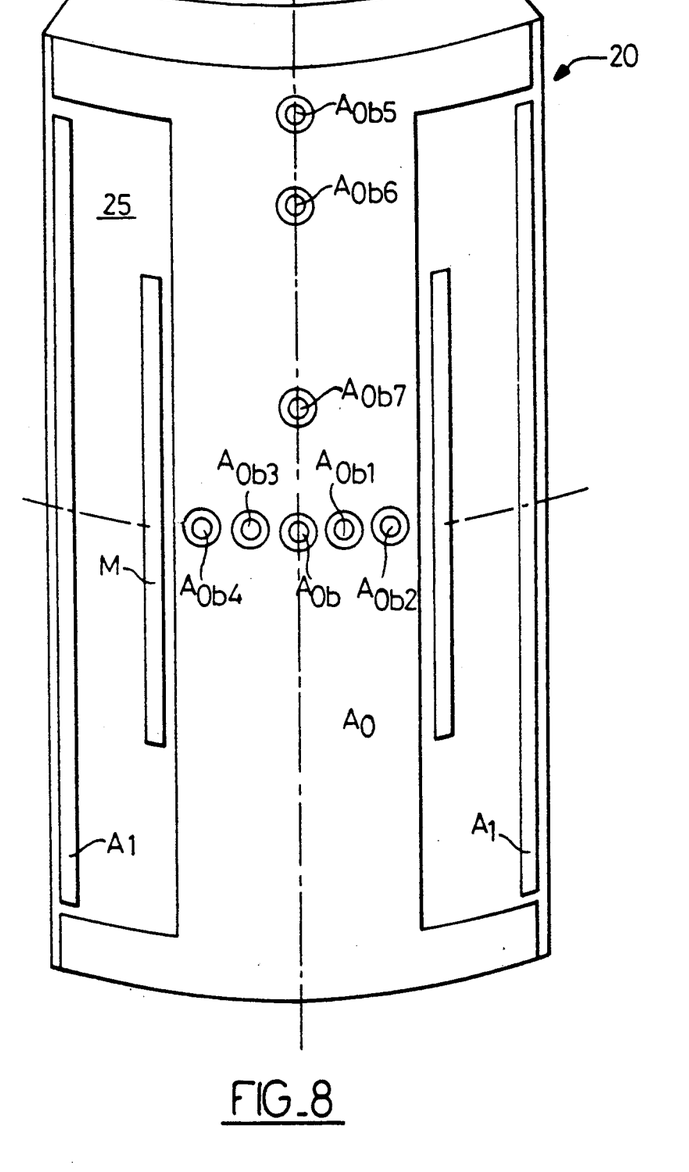
FIG. 8 shows a modification of the preferred embodiment.

In a modification of the preferred embodiment as shown in FIG. 8, the pad is provided with additional electrodes $A_{0b1}$, $A_{0b2}$, $A_{0b3}$, ..., $A_{0b7}$ of substantially the same size as central electrode $A_{0b}$. These additional electrodes are disposed inside the polygonal I-shaped surface constituted by guard electrode $A_0$ and they are disposed therein in a spaced-apart configuration along one and/or the other of the lateral and longitudinal directions.

Each of these additional electrodes is connected to a circuit which is identical to that connected to central electrode $A_{0b}$, i.e., each of them delivers an additional measuring current corresponding to an additional resistivity measurement.

Additional electrodes $A_{0b1}$, ..., $A_{0b4}$ are aligned along an axis perpendicular to the axis of the borehole and serve to obtain a plurality of resistivity measurements having substantially the same lateral investigation depth, and they may optionally be combined with one another in order to produce a quantitative electrical image of the wall of the borehole.

Additional electrodes $A_{0b5}$, ..., $A_{0b7}$ are aligned along an axis parallel to the axis of the borehole and serve to obtain a plurality of resistivity measurements of decreasing lateral investigation depth on going away from central electrode $A_{0b}$, and they may optionally be used for correcting the measurement of the measuring current $I_{0b}$ when the mudcake becomes too thick.

Figure 9:
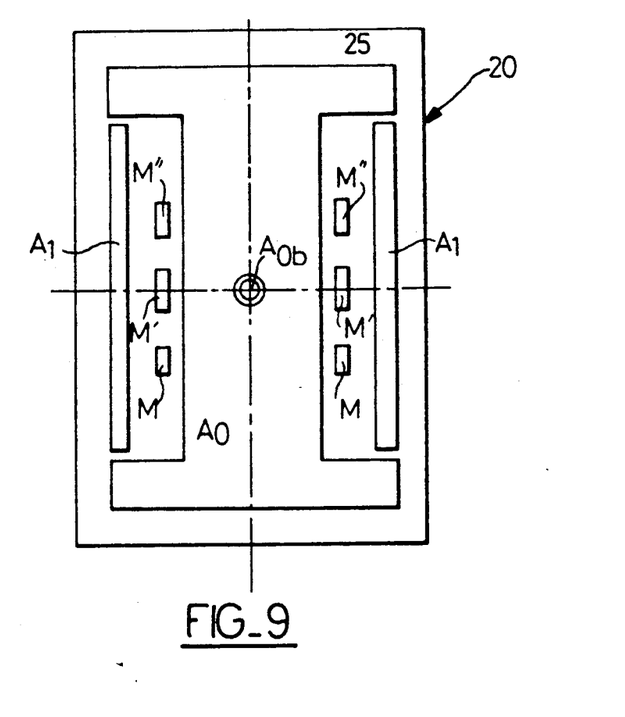
FIGS. 9 and 10 show two other modifications, respectively.

In another modification shown in FIG. 9, each of the monitor electrodes M may be split up into a plurality of aligned monitor electrodes M, M', and M''. In this embodiment, the potential used for control purposes may be the mean of the potentials measured on the three pairs of electrodes M, M', and M''.

Figure 10:
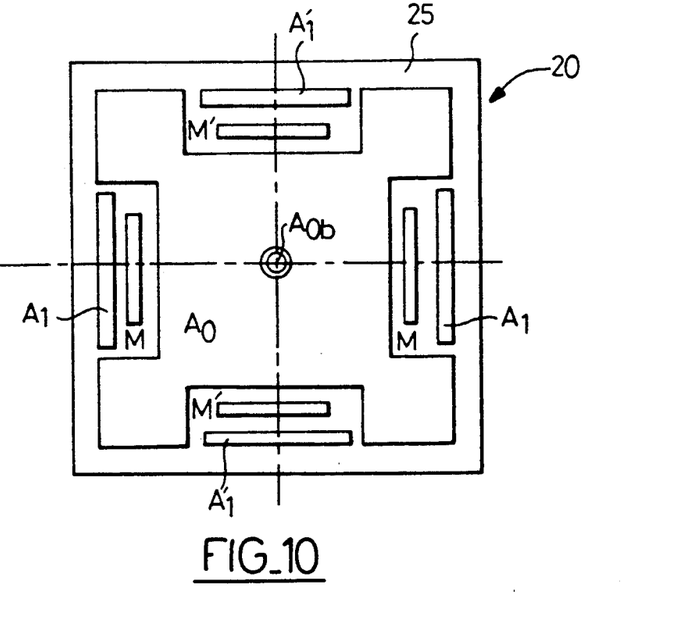

A further modification shown in FIG. 10 is the result of notionally superimposing two pads, with one of the pads being rotated through 90° relative to the other. In other words, the measuring current $I_{0b}$ can be focused radially, both along both the first and the second directions by means of the passive focusing system by increasing the size of the guard electrode $A_0$ in the first direction, and along both the second and first directions by means of two substantially identical active focusing systems which are independent from each other and which operate using respective focusing currents.

In this modification, guard electrode $A_0$ is constituted by a polygonal surface which is substantially square in shape, with each of the sides of the square having a cutout containing a monitor electrode and a focusing electrode. The first active focusing system is constituted by a pair of monitor electrodes M and focusing electrodes $A_1$, and the second active focusing system is constituted by a pair of monitor electrodes M' and focusing electrodes $A'_1$.

The electrical circuit which adjusts the focusing current $I'_1$ delivered by the electrodes $A'_1$ is identical to that described with reference to FIG. 7. However, it is independent from the circuit used for adjusting the focusing current $I_1$ delivered by the electrodes $A_1$.

While the invention has been described with reference to particular embodiments, it is to be appreciated that the embodiments are illustrative and that the invention is not intended to be limited to only the disclosed embodiment. Variations within the spirit and scope of the invention will occur to those skilled in the art. Accordingly, variation in these and other such features are contemplated and are within the scope of the present invention.

What we claim as our invention is:

1. A method of logging an earth formation traversed by a borehole to determine the electrical resistivity thereof, said method employing a sonde having a return electrode and a measuring pad adapted to be pressed against the wall of the borehole, said method comprising the steps of:

pressing the measuring pad against the wall of the borehole, said measuring pad having an array of electrodes including a central electrode, at least one guard electrode, at least one monitoring electrode and at least one focussing electrode;

delivering a measuring current from the central electrode to the borehole;

focusing said measuring current radially in a first direction by means of an active focusing system;

focusing said measuring current radially along a second direction, perpendicular to said first direction, by means of a passive focusing system;

receiving said measuring current at the return electrode; and measuring the value of the received current, thereby determining the resistivity of the formation.

2. A method according to claim 1, wherein the step of focusing said measuring current by means of an active focusing system comprises:

delivering a first focusing current from a pair of focusing electrodes disposed symmetrically in said first direction about the central electrode; and adjusting the value of the first focusing current so as to maintain the potential difference between a first and a second pair of monitor electrodes at zero, with the electrodes of each pair being disposed symmetrically along said first direction about the central electrode, between the central electrode and the pair of focusing electrodes.

3. A method according to claim 1, wherein the step of focusing said measuring current by means of a passive focusing system comprises:

delivering a second focusing current from at least one guard electrode disposed symmetrically in said second direction about the central electrode; and maintaining the central electrode at the potential of the guard electrode.

4. A method according to claim 3, wherein the passive focusing system comprises two guard electrodes.

5. A method according to claim 4, wherein each of the two guard electrodes is constituted by a surface which is substantially rectangular.

6. A method according to claim 4, wherein each of the two guard electrodes is constituted by a polygonal surface which is substantially T-shaped.

7. A method according to claim 6, wherein the horizontal branch of the T-shaped polygonal surface extends on either side of the vertical branch thereof through a distance equal to the distance between the central electrode and the focusing electrodes.

8. A method according to claim 3, wherein the passive focusing system comprises a single guard electrode which completely surrounds the central electrode.

9. A method according to claim 8, wherein the single guard electrode is constituted by a surface which is substantially rectangular.

10. A method according to claim 8, wherein the single guard electrode is constituted by a polygonal surface which is I-shaped.

11. A method according to claim 10, wherein the horizontal branches of the I-shaped polygonal surface extend on either side of the vertical branch thereof through a distance equal to the distance between the central electrode and the focusing electrodes.

12. A method according to claim 10, wherein the guard electrode and the pair of monitor electrodes closest to the central electrode are constituted by a single electrode.

13. A method according to claim, further including the steps of:

focusing said measuring current radially along said first direction by means of the passive focusing system; and focusing said measuring current radially along said second direction by means of a second active focusing system.

14. A method according to claim 13, wherein the step of focusing said measuring current by means of a second active focusing system comprises:

delivering a third focusing current from a second pair of focusing electrodes disposed symmetrically in said second direction about the central electrode; and adjusting the value of the third focusing current in such a manner as to maintain the potential difference between third and fourth pairs of monitor electrodes at zero, with the electrodes of each pair being disposed symmetrically in said second direction about the central electrode, between the central electrode and the pair of focusing electrodes.

15. A logging apparatus for determining the electrical resistivity of an earth formation traversed by a borehole, comprising a measuring pad adapted to be pressed against the wall of the borehole and provided on its face which comes into contact with the wall of the borehole with an array of electrodes, said apparatus comprising:

a central electrode belonging to said array of electrodes and operable to deliver a measuring current;

a return electrode for receiving said measuring current in a zone situated inside the borehole, behind the pad;

an active focusing system suitable for focusing said measuring current radially along a first direction;

a passive focusing system suitable for focusing said measuring current radially along a second direction, perpendicular to said direction; and means for measuring the value of the measuring current in order to determine the resistivity of the formation.

16. Apparatus according to claim 15, wherein said active focusing system comprises:

a pair of focusing electrodes disposed symmetrically along said first direction about the central electrode and operable to deliver a first focusing current; and means for adjusting the value of the first focusing current in such a manner as to maintain the potential difference between first and second pairs of monitor electrodes at zero, the electrodes of each pair being disposed symmetrically along said first direction about the central electrode, between the central electrode and the pair of focusing electrodes.

17. Apparatus according to claim 15, wherein said passive focusing system comprises:

at least one guard electrode disposed symmetrically along said second direction about the central electrode and operable to deliver a second focusing current; and means for maintaing the central electrode at the potential of the guard electrode.

18. Apparatus according to claim 17, including two guard electrodes.

19. Apparatus according to claim 18, wherein each of the two guard electrodes is formed by a surface which is substantially rectangular.

20. Apparatus according to claim 18, wherein each of the two guard electrodes is formed by a polygonal surface which is T-shaped.

21. Apparatus according to claim 20, wherein the horizontal branch of the T-shaped polygonal surface extends on either side of the vertical branch thereof through a distance equal to the distance between the central electrode and the focusing electrodes.

22. Apparatus according to claim 17, including a single guard electrode which completely surrounds the central electrode.

23. Apparatus according to claim 22, wherein the single guard electrode is formed by a surface which is substantially rectangular.

24. Apparatus according to claim 22, wherein the single guard electrode is formed by a polygonal surface which is I-shaped.

25. Apparatus according to claim 24, wherein the horizontal branches of the I-shaped polygonal surface extend on either side of the vertical branch through a distance equal to the distance between the central electrode and the focusing electrodes.

26. Apparatus according to claim 24, wherein the guard electrode and the pair of monitor electrodes closest to the central electrode are constituted by a single electrode.

27. Apparatus according to claim 15, further comprising:

additional electrodes substantially identical to the central electrode and disposed inside the surface formed by the guard electrode in spaced-apart manner along one and/or the other of said directions;

means for delivering additional measuring currents from each of said additional electrodes;

means for maintaining each of said additional electrodes at the same potential as the guard electrodes;

and means for measuring the values of said additional measuring currents.

28. Apparatus according to claim 15, further including a second active focusing system operable to focus said measuring current radially along said second direction, and wherein said passive focusing system is also operable to focus said measuring current radially along said first direction.

* * * * *